United States Patent
Candelore et al.

(10) Patent No.: US 12,520,005 B2
(45) Date of Patent: Jan. 6, 2026

(54) ATSC BOUNDARY CONDITION FALL OVER TO INTERNET

(71) Applicant: Sony Group Corporation, Tokyo (JP)

(72) Inventors: Brant Candelore, San Diego, CA (US); Adam Goldberg, Fairfax, VA (US); Fred Ansfield, San Diego, CA (US); Graham Clift, San Diego, CA (US); Luke Fay, San Diego, CA (US); Loren F. Pineda, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/487,069

(22) Filed: Oct. 14, 2023

(65) Prior Publication Data

US 2025/0126332 A1    Apr. 17, 2025

Related U.S. Application Data

(63) Continuation of application No. 17/534,351, filed on Nov. 23, 2021, now Pat. No. 11,825,155.

(51) Int. Cl.
| | |
|---|---|
| H04N 21/438 | (2011.01) |
| H04N 17/00 | (2006.01) |
| H04N 21/414 | (2011.01) |
| H04N 21/426 | (2011.01) |
| H04N 21/462 | (2011.01) |
| H04N 21/61 | (2011.01) |
| H04N 21/647 | (2011.01) |

(52) U.S. Cl.
CPC ....... *H04N 21/4383* (2013.01); *H04N 17/004* (2013.01); *H04N 21/41407* (2013.01); *H04N 21/4263* (2013.01); *H04N 21/4622* (2013.01); *H04N 21/6131* (2013.01); *H04N 21/6193* (2013.01); *H04N 21/647* (2013.01)

(58) Field of Classification Search
CPC ............. H04N 21/647; H04N 21/4263; H04N 21/6193
See application file for complete search history.

(56) References Cited

U.S. PATENT DOCUMENTS

| | | | |
|---|---|---|---|
| 10,555,187 B2 | 2/2020 | Lei et al. | |
| 10,904,791 B2 | 1/2021 | Naik et al. | |
| 11,825,155 B2 * | 11/2023 | Candelore | .......... H04N 21/4622 |
| 2009/0013363 A1 | 1/2009 | Lee | |

(Continued)

FOREIGN PATENT DOCUMENTS

| | | |
|---|---|---|
| EP | 3669503 A1 | 6/2020 |
| JP | 2006523417 A | 10/2006 |

(Continued)

*Primary Examiner* — Michael R Telan
(74) *Attorney, Agent, or Firm* — John L. Rogitz; John M. Rogitz

(57) ABSTRACT

Techniques are described for expanding and/or improving the Advanced Television Systems Committee (ATSC) 3.0 television protocol in robustly delivering the next generation broadcast television services. A receiver, to automatically switch from presenting a service on a first frequency to a second frequency such as when a mobile receiver is moving through a boundary region between two broadcasters, can temporarily use a satellite link or 5G wireless telephony or other over the top (OTT) source to acquire a service until an OTA link satisfies quality requirements.

20 Claims, 5 Drawing Sheets

(56) References Cited

U.S. PATENT DOCUMENTS

| | | | |
|---|---|---|---|
| 2011/0096243 A1* | 4/2011 | Casagrande | H04N 21/4383 |
| | | | 348/731 |
| 2013/0291026 A1* | 10/2013 | Yu | H04B 17/318 |
| | | | 725/62 |
| 2017/0188054 A1* | 6/2017 | Ma | H04L 67/563 |
| 2021/0409816 A1* | 12/2021 | Menon | H04N 21/4384 |
| 2022/0103897 A1* | 3/2022 | Velusamy | H04N 21/6131 |
| 2022/0377422 A1* | 11/2022 | James | H04N 21/41407 |

FOREIGN PATENT DOCUMENTS

| | | |
|---|---|---|
| KR | 20200054549 A | 5/2020 |
| WO | WO-2004080011 A1 | 9/2004 |

* cited by examiner

ATSC BOUNDARY CONDITION FALL OVER TO INTERNET

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air" or OTA) and related broadband delivered content and services (referred to as "over the top" or OTT). ATSC 3.0 is designed to be flexible so that as technology evolves, advances can be readily incorporated without requiring a complete overhaul of any related technical standard.

As understood herein, an ATSC 3.0 receiver scans for services including in reception areas that contain two or more frequencies carrying the same service, as may occur in a boundary region in which broadcast signals from two regional ATSC 3.0 broadcaster stations overlap. These boundary regions exist in a multi-frequency network (MFN).

SUMMARY

As further understood herein, in multi-frequency networks, an ATSC 3.0 receiver may not be able to fall back on a second broadcast frequency service due to unmet quality metrics. The service on the second frequency might be worse than the service currently tuned to and that might be suffering degradation. Problems can arise with reception at boundary conditions when a service broadcast on a frequency gets degraded as a mobile receiver moves out of range or is momentarily blocked due to terrain, e.g., a hillside, trees, buildings, or other structure.

Accordingly, in digital television (DTV) in which at least one receiver can receive broadcast signals, a method includes tuning to a primary DTV service broadcast over-the-air (OTA) from at least a first OTA transmitter. The method also includes presenting on at least one display the primary DTV service. Further, the method includes scanning for a duplicate of the primary DTV service from at least a second OTA transmitter and responsive to at least one condition pertaining to the primary DTV service, presenting the duplicate of the primary DTV service. The method still further includes, responsive to at least one condition pertaining to the duplicate of the primary DTV service, acquiring a duplicate of the primary DTV service from a wireless transceiver, and presenting the duplicate of the primary DTV service on the display. The method includes, responsive to acquiring the primary DTV service from an OTA transmitter with a quality satisfying at least one condition, presenting the DTV service from the OTA transmitter with the quality satisfying at least one condition.

If desired, the method may include, responsive to acquiring the primary DTV service from an OTA transmitter with a quality satisfying at least one condition, terminating a link between the receiver and the transceiver.

In example implementations the transceiver can include at least one wireless telephony transceiver such as at least one 5G base station, and/or at least one satellite, and/or at least one Wi-Fi transceiver.

The condition pertaining to the primary DTV service may include at least one quality metric.

In another aspect, a digital television (DTV) apparatus includes at least one digital television (DTV) receiver and at least one processor programmed with instructions to configure the processor to present a DTV service received from at least one over-the-air DTV transmitter on at least one display. The instructions are executable to, upon OTA signal degradation in which the DTV service from any OTA DTV transmitter no longer is presentable by the receiver with a first quality, acquire the DTV service from a wireless transceiver for presentation on the display. The instructions are executable to, responsive to acquiring the DTV service from any OTA transmitter and having the first quality, switch from presenting the DTV service acquired from the transceiver to presenting the service acquired from the OTA transmitter and having the first quality.

In another aspect, a device includes at least one computer storage that is not a transitory signal and that in turn includes instructions executable by at least one processor to present a digital television (DTV) service from at least one over-the-air (OTA) DTV transmitter until such time as the DTV service is not received from any OTA DTV transmitter with a first signal quality. Then, the instructions are executable to switch to presenting the DTV service from a wireless telephony or satellite transmitter, and as soon as the DTV service is available OTA with the first signal quality, switch back to presenting the DTV service from an OTA transmitter.

The details of the present application, both as to its structure and operation, can best be understood in reference to the accompanying drawings, in which like reference numerals refer to like parts, and in which:

DETAILED DESCRIPTION

Figure 1:
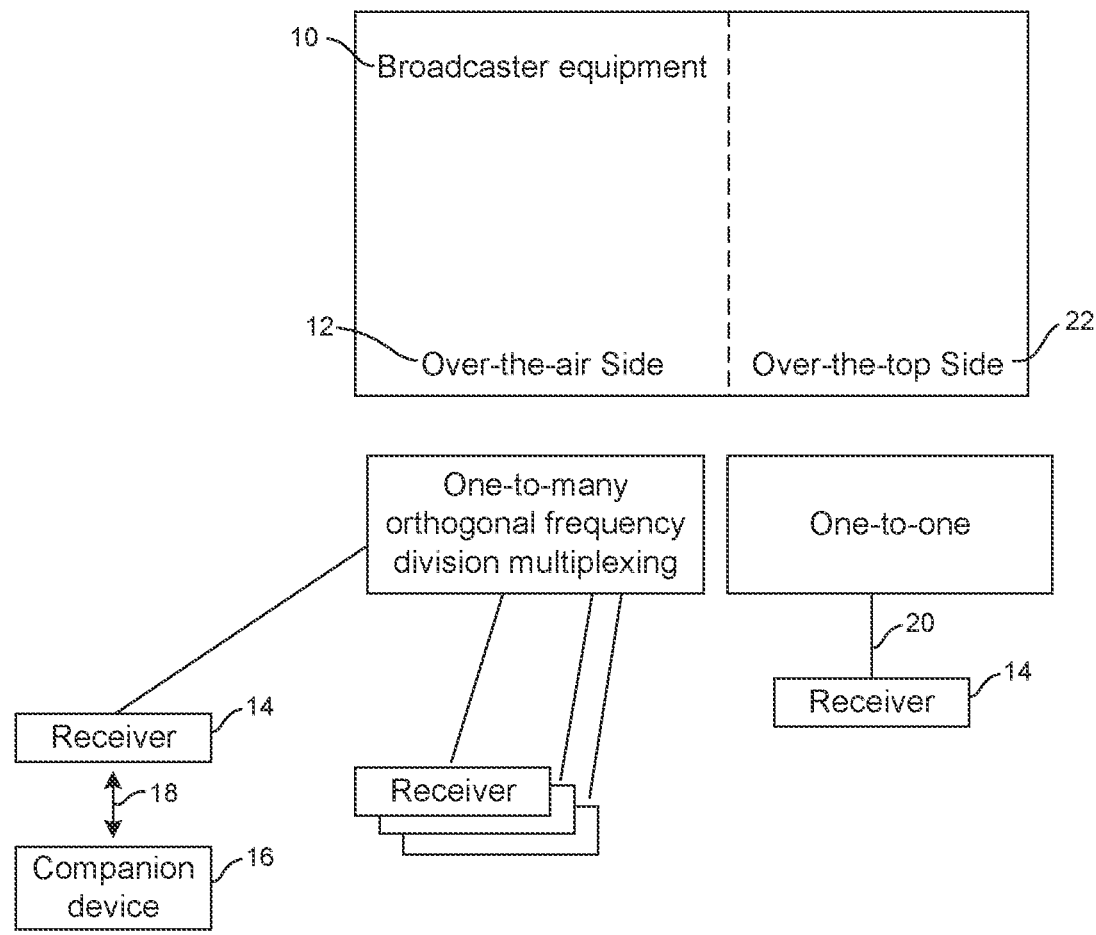
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable universal serial bus (USB) thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

A recitation of "having at least one of A, B, and C" (likewise "having at least one of A, B, or C" and "having at least one of A, B, C") includes A alone, B alone, C alone, A and B together, A and C together, B and C together, and/or A, B, and C together, etc.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). As set forth further below, this OTT or secondary content may be received from a satellite or a wireless telephony network, for example. Note that computerized devices described in all of the figures herein may include some or all of the components set forth for various devices in FIGS. 1 and 2.

Figure 2:
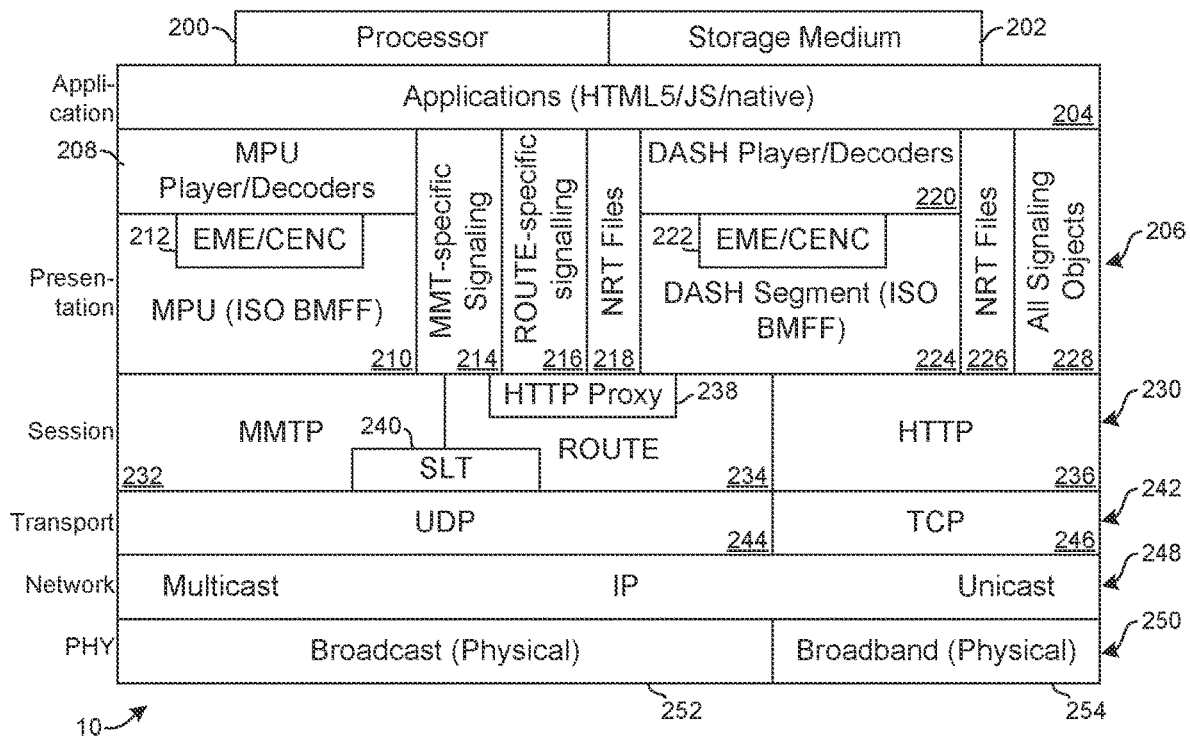
FIG. 2 illustrates components of the devices shown in FIG. 1.
Figure 2:
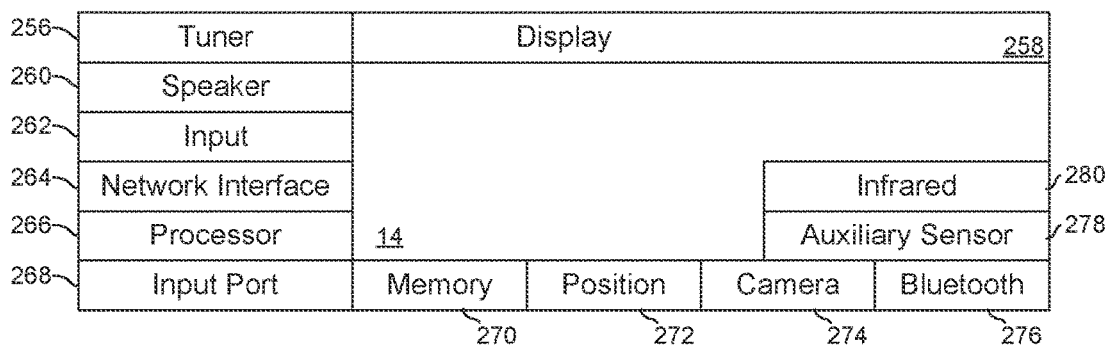

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV one or more ATSC 3.0 TV tuners (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, a motor vehicle, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g., receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
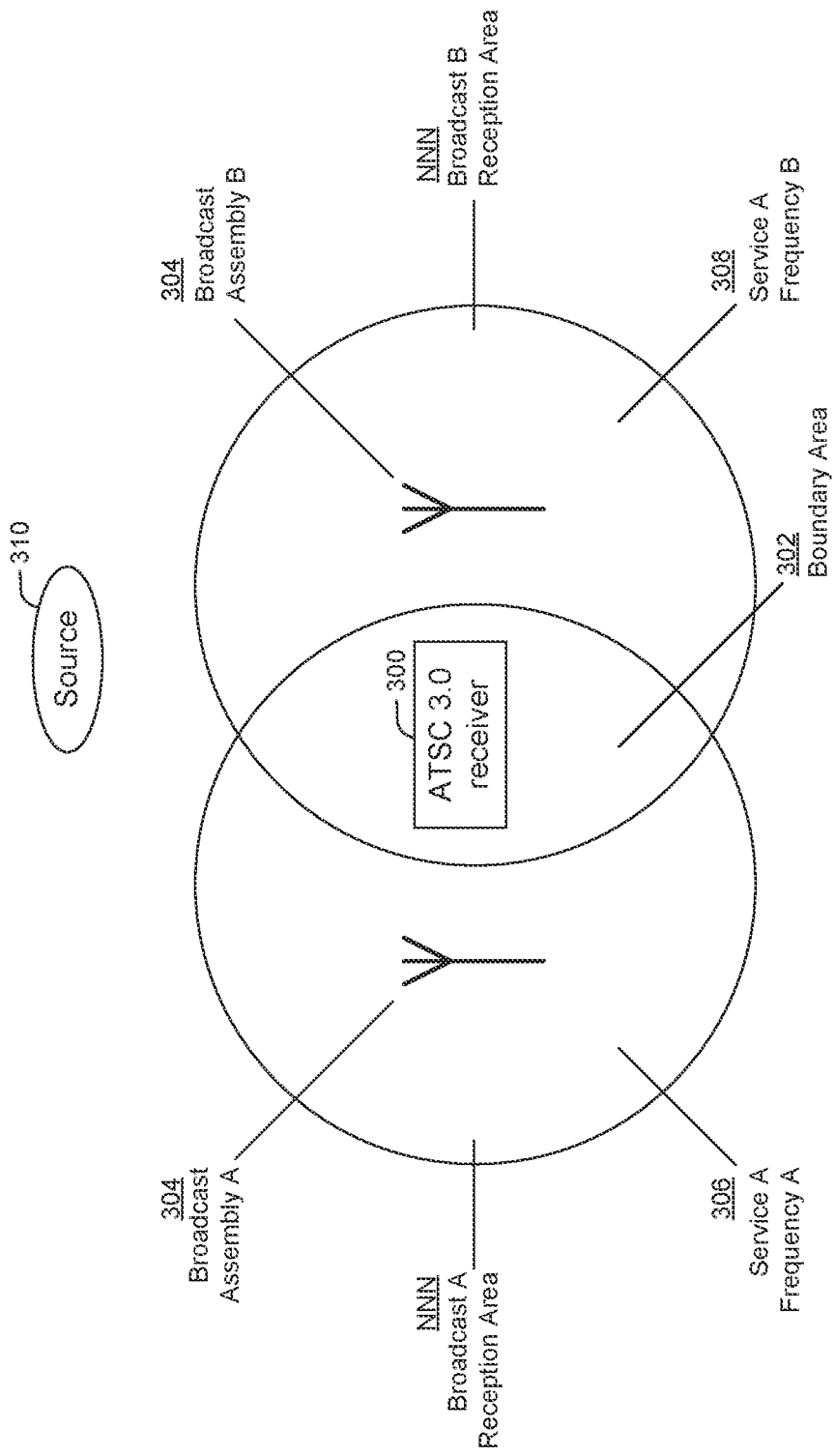
FIG. 3 illustrates an example specific system.

Now referring to FIG. 3, a simplified digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 being picked up by the receiver 300 in the region 302. A first ATSC 3.0 service ("Service A") is broadcast from the first broadcast station 304 over a first frequency 306, whereas the same service A is broadcast from the second broadcast station 304 over a second frequency 308 different from the first frequency 306. The receiver 300 picks up both frequencies, i.e., the receiver 300 picks up signals from both broadcast stations 304.

One or more OTT sources 310 may be available in the region shown in FIG. 3. The source 310 may be, e.g., a 5G access point or satellite transceiver such as a Starlink transponder or Wi-Fi transceiver that may be able to provide an ATSC 3.0 service. A content aggregator (providing the Internet service for the broadcaster) might have a content repository as well. Using a data service in this way for high bandwidth video content might be expensive to use consistently in this way, so that when a service on an OTA frequency becomes available, then the receiver will switch back. And so, while connected to the internet, the receiver monitors the OTA frequencies to see if a service is available. And if it is, then the switch may occur.

The receiver may have plural tuner/demodulator pairs as described in the present assignee's U.S. patent application Ser. Nos. 17/494,804 and 17/489,732, both of which are incorporated herein by reference.

Figure 4:
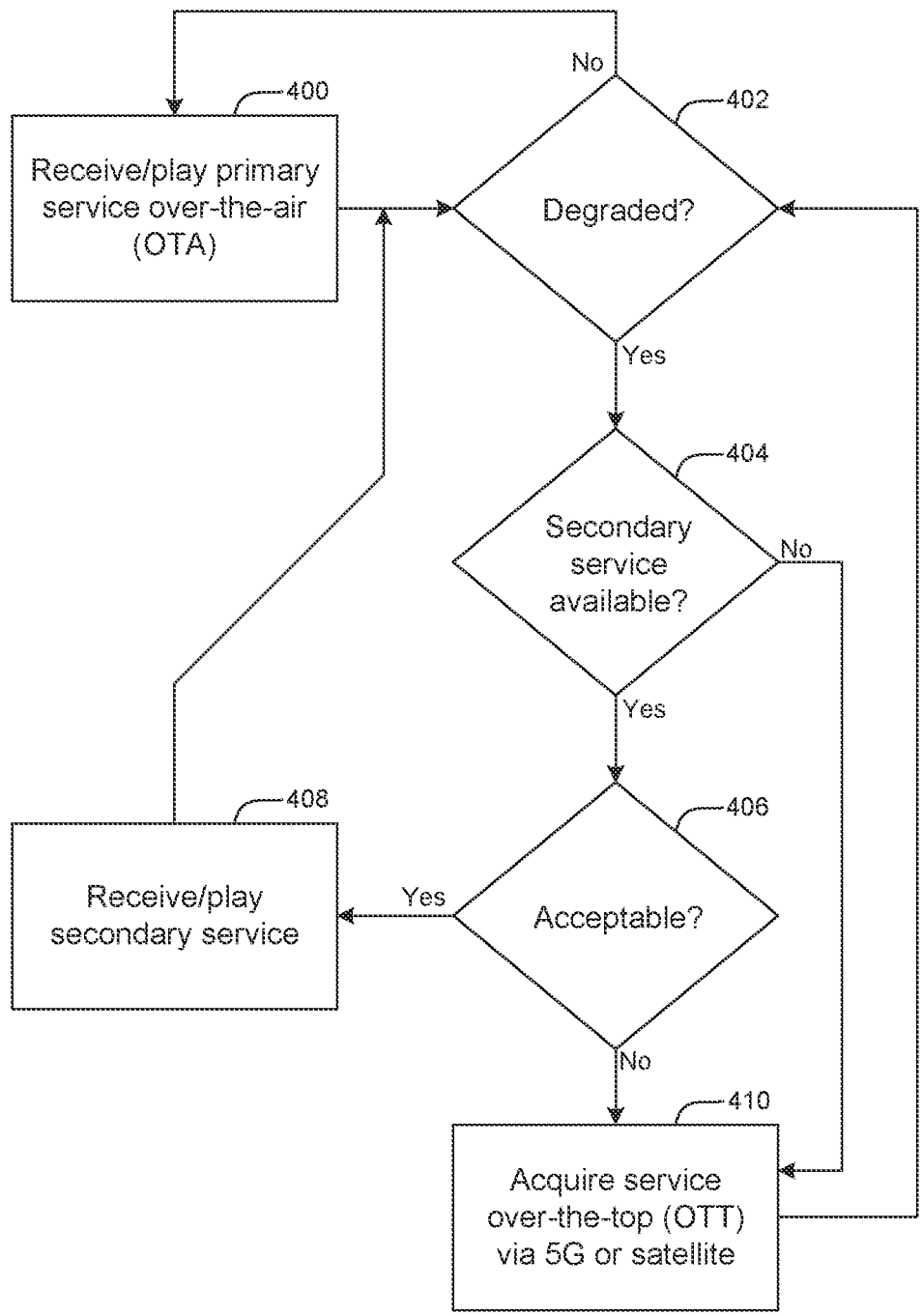
FIG. 4 illustrates example logic in example flow chart format consistent with present principles.

FIG. 4 illustrates. Commencing at block 400, a primary digital TV service is acquired by an ATSC receiver such as a mobile ATSC 3.0 receiver traversing the boundary region shown in FIG. 3. The service is presented on a display.

State 402 indicates that as the receiver moves, the signal quality of the primary service as measured by, e.g., any one or more of the quality metrics discussed below may degrade below a threshold or thresholds considered to be acceptable. Those thresholds may be established to remain static or may be dynamically changed as the receiver moves, depending on the particular combination of quality metrics used, the location and direction of motion of the receiver, the locations of nearby transmitters, and topography of the environs of the receiver, for example. Machine learning may be used for establishing dynamic thresholds. A ML model may be trained on ground truth parameters such as quality metric values, transmitter locations, receiver course/speed/locations, and topography correlated to example ground truth thresholds.

As long as the primary service remains acceptable in terms of quality, it may be presented. However, if the outcome of decision diamond 402 is that the primary service has degraded as compared to the threshold(s), the logic may move to state 404 to determine whether a substitute version of the service is available on, e.g., another frequency from a different OTA transmitter. It should be noted that a receiver might not seek a version of the service from a different OTA transmitter but might seek to obtain it directly from an OTT source as mentioned previously. OTT sources, e.g., a 5G base stations, might be more available in a geographic location than an OTA broadcast station. The link for the OTT source may be signaled as secondary service in the primary service. And, although not shown, the logic may then move from the decision diamond 402 to state 410.

By "secondary service" is meant an alternate OTA service. In another definition "secondary service" means any alternate to the currently-tuned "primary service," whether delivered OTA or OTT.

For the case where the receiver does look for a secondary OTA service, if one is available as indicated by, e.g., a scan of the spectrum by a secondary tuner that is different from the primary tuner through which the primary service is acquired the logic may move to state 406 to determine whether the signal quality of the secondary service as measured by, e.g., any one or more of the quality metrics discussed below may degrade below a threshold or thresholds considered to be acceptable. Those thresholds may be established to remain static or may be dynamically changed as the receiver moves, depending on the particular combination of quality metrics used, the location and direction of motion of the receiver, the locations of nearby transmitters, and topography of the environs of the receiver, for example. Machine learning may be used for establishing dynamic thresholds. A ML model may be trained on ground truth parameters such as quality metric values, transmitter locations, receiver course/speed/locations, and topography correlated to example ground truth thresholds.

Responsive to a secondary or substitute service being available and of acceptable quality, the logic moves to state 408 to tune to and play the secondary service on the display in lieu of the (degraded) primary service. The secondary tuner may be used for this purpose with the primary tuner scanning for additional services, or the primary tuner may tune to the OTA signal carrying the secondary service and be used for presenting the service, with the secondary tuner resuming its scanning role.

On the other hand, if no secondary service is available OTA at state 404 or if the secondary service does not have sufficient quality at state 406, the logic moves to state 410 to acquire the secondary service via a wireless transmitter such as a wireless telephony transceiver such as a 5G base station or a Wi-Fi transceiver or a satellite transponder such as from a satellite in the Starlink satellite network. The service so acquired OTT is presented on the display associated with the receiver.

However, recognizing that such an OTT unicast link may be relatively expensive, the logic continues to monitor for an acceptable OTA link, either primary at state 402 or failing that secondary at state 404, switching back to presenting the service OTA as soon as an acceptable OTA signal is available and terminating the wireless OTT link.

Accordingly, a receiver consistent with present principles herein may receive broadcast digital TV OTA from one or more DTV broadcast transmitters. Such transmitters typically broadcast TV signals that can be picked up by any DTV receiver without the DTV receiver exchanging identifying or authentication information with the transmitter, although in some cases if desired the OTA service may be protected using digital rights management (DRM) and some content delivered OTA may be subscription content. Content received OTA is input to the OTA stack of the receiver which mirrors the OTA stack of the transmitter shown in FIG. 2.

A receiver consistent with present principles may further include a secondary receiving device such as but not limited to wireless telephony receiver such as discussed above in reference to the network interface 264 shown in FIG. 2 and/or a satellite receiver such as discussed above in reference to the input 268 shown in FIG. 2. Wi-Fi also may be used. Content received via the secondary receiving device typically is input to the OTT stack of the receiver which mirrors the OTT stack of the transmitter shown in FIG. 2.

Content received via the secondary receiving device typically is not broadcast in a manner that any receiver may receive and use it. Instead, content delivered, e.g., over a wireless telephony data network typically is point-to-point from a wireless telephony transceiver to a telephone number associated with the secondary receiving device. Content delivered, e.g., over a wireless path from a satellite network typically is sent to a specific network address associated with the secondary receiving device.

Figure 5:
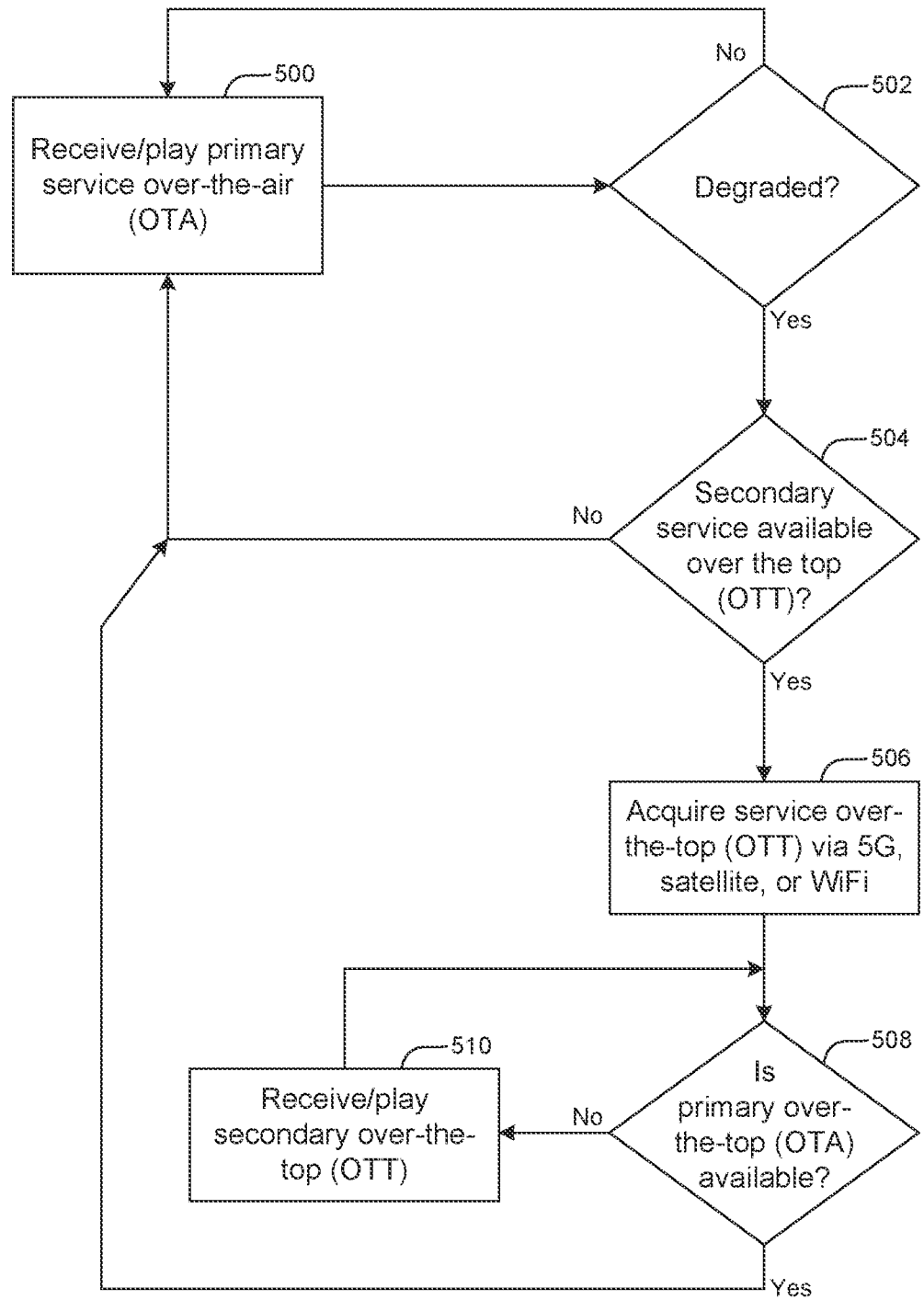
FIG. 5 illustrates example logic in example flow chart format consistent with present principles.

FIG. 5 illustrates additional techniques. Commencing at block 500, a primary digital TV service is acquired by an ATSC receiver such as a mobile ATSC 3.0 receiver traversing the boundary region shown in FIG. 3. The service is presented on a display.

State 502 indicates that as the receiver moves, the signal quality of the primary service as measured by, e.g., any one or more of the quality metrics discussed below may degrade below a threshold or thresholds considered to be acceptable. Those thresholds may be established to remain static or may be dynamically changed as the receiver moves, depending on the particular combination of quality metrics used, the location and direction of motion of the receiver, the locations of nearby transmitters, and topography of the environs of the receiver, for example. Machine learning may be used for establishing dynamic thresholds. A ML model may be trained on ground truth parameters such as quality metric values, transmitter locations, receiver course/speed/locations, and topography correlated to example ground truth thresholds.

As long as the primary service remains acceptable in terms of quality, it may be presented. However, if the outcome of decision diamond 502 is that the primary service has degraded as compared to the threshold(s), the logic may move to state 504 to determine whether a substitute version of the service is available on, e.g., a wireless link other than an ATSC 3.0 OTA link, e.g., a wireless OTT link from a satellite or from a wireless telephony network such as from a 5G base station signaled as secondary service in the primary service.

For the case where a substitute service is available at state 506, the logic moves to block 506 to acquire the substitute service in lieu of the (degraded) primary service. On the other hand, if no substitute service is available at state 504, the logic may loop back to block 500 to attempt to play the primary service.

From block 506 the logic may loop to state 508 to determine if the primary service once again becomes available OTA at an acceptable quality. If so, the logic loops ack to block 500. Otherwise, the logic continues to play the substitute service at block 510 as received OTT as described above.

Quality metrics of RF frequencies are discussed herein and may be identified and stored. The quality metrics can include, e.g., signal to noise ratio (SNR) and error rate as may be represented by, e.g., packet error number (PEN). The quality metrics can include resolution, e.g., whether a service is in high definition (HD) or standard definition (SD). The quality metric also can include bitrate and form-factor, recognizing that not all HD is the same. The quality metrics can include content attributes such as whether a service supports foreign languages, accessibility signaling (e.g., where signing is being done), audio description, and other content aspects. The quality metrics can include locality preference (such as a first region channel being strong, but all the ads are for the first region and not a second region preferred by the user so that a duplicate service from the second region may be accorded preference over the first region). The quality metrics can include quality of user interfaces carried in the service.

In non-limiting examples SNR may be determined during the scan by noting both the received signal strength of each received frequency and any accompanying noise on that frequency and determining the quotient thereof. Error rate may be determined by, e.g., determining a percentage of packets missed (by noting missing packet numbers) and/or by determining a percentage of received packets with errors in them as determined by error correction algorithms.

It will be appreciated that whilst present principals have been described with reference to some example embodiments, these are not intended to be limiting, and that various alternative arrangements may be used to implement the subject matter claimed herein.

What is claimed is:

1. In digital television (DTV) system in which at least one receiver can receive broadcast signals, a method, comprising:
    tuning to a primary DTV service broadcast over-the-air (OTA) from a first OTA transmitter;
    presenting the primary DTV service broadcast OTA from the first OTA transmitter;
    based on OTA signal degradation, scanning for and identifying a duplicate of the primary DTV service from a wireless transceiver;
    executing a machine learning (ML) model to determine whether the duplicate of the primary DTV service from the wireless transceiver meets a dynamic threshold;
    based on the duplicate of the primary DTV service from the wireless transceiver meeting the dynamic threshold, acquiring the duplicate of the primary DTV service from the wireless transceiver;
    presenting the duplicate of the primary DTV service from the wireless transceiver; and
    responsive to acquiring the primary DTV service from a second OTA transmitter, switch from presenting the primary DTV service from the wireless transceiver to presenting the primary DTV service from the second OTA transmitter.

2. The method of claim 1, wherein the ML model is a model trained on one or more ground truth parameters correlated to one or more respective ground truth thresholds.

3. The method of claim 2, wherein the one or more ground truth parameters comprise one or more quality metric values.

4. The method of claim 2, wherein the one or more ground truth parameters comprise one or more transmitter locations.

5. The method of claim 2, wherein the one or more ground truth parameters comprise one or more receiver courses.

6. The method of claim 2, wherein the one or more ground truth parameters comprise one or more receiver speeds.

7. The method of claim 2, wherein the one or more ground truth parameters comprise one or more receiver locations.

8. The method of claim 2, wherein the one or more ground truth parameters comprise topography.

9. A digital television (DTV) apparatus comprising:
    at least one digital television (DTV) receiver; and
    at least one processor programmed with instructions to configure the processor to:
    present a DTV service received from at least a first over-the-air (OTA) DTV transmitter on at least one display;
    upon OTA signal degradation, scan for and identify the DTV service from a wireless transceiver;
    execute a machine learning (ML) model to determine whether the DTV service from the wireless transceiver meets a dynamic threshold;
    based on the DTV service from the wireless transceiver meeting the dynamic threshold, acquiring the DTV service from the wireless transceiver;
    present the DTV service acquired from the wireless transceiver on the display; and
    responsive to acquiring the DTV service from a second OTA transmitter, switch from presenting the DTV service acquired from the wireless transceiver to presenting the service acquired from the second OTA transmitter.

10. The DTV apparatus of claim 9, wherein the ML model is a model trained on one or more ground truth parameters correlated to one or more respective ground truth thresholds.

11. The DTV apparatus of claim 10, wherein the one or more ground truth parameters comprise one or more quality metric values.

12. The DTV apparatus of claim 10, wherein the one or more ground truth parameters comprise one or more transmitter locations.

13. The DTV apparatus of claim 10, wherein the one or more ground truth parameters comprise one or more receiver speeds.

14. The DTV apparatus of claim 10, wherein the one or more ground truth parameters comprise one or more receiver locations.

15. The DTV apparatus of claim 10, wherein the one or more ground truth parameters comprise topography.

16. A device comprising:
    at least one computer storage that is not a transitory signal and that comprises instructions executable by at least one processor to:

present a digital television (DTV) service from at least a first over-the-air (OTA) DTV transmitter;
scan for and identify the DTV service from a second OTA DTV transmitter;
execute a machine learning (ML) model to determine whether the DTV service from the second OTA DTV transmitter meets a dynamic threshold;
based on the DTV service from the second OTA DTV transmitter meeting the dynamic threshold, acquiring the DTV service from the second OTA DTV transmitter; and
based on acquiring the DTV service from the second OTA DTV transmitter, presenting the DTV service from the second OTA transmitter.

17. The device of claim 16, wherein the ML model is a model trained on one or more ground truth parameters correlated to one or more respective ground truth thresholds.

18. The device of claim 17, wherein the one or more ground truth parameters comprise one or more quality metric values.

19. The device of claim 17, wherein the one or more ground truth parameters comprise one or more transmitter locations.

20. The DTV apparatus of claim 17, wherein the one or more ground truth parameters comprise one or more receiver speeds.

* * * * *